July 12, 1960
R. R. DAHL
2,944,565
ACTUATOR VALVE
Filed May 8, 1956
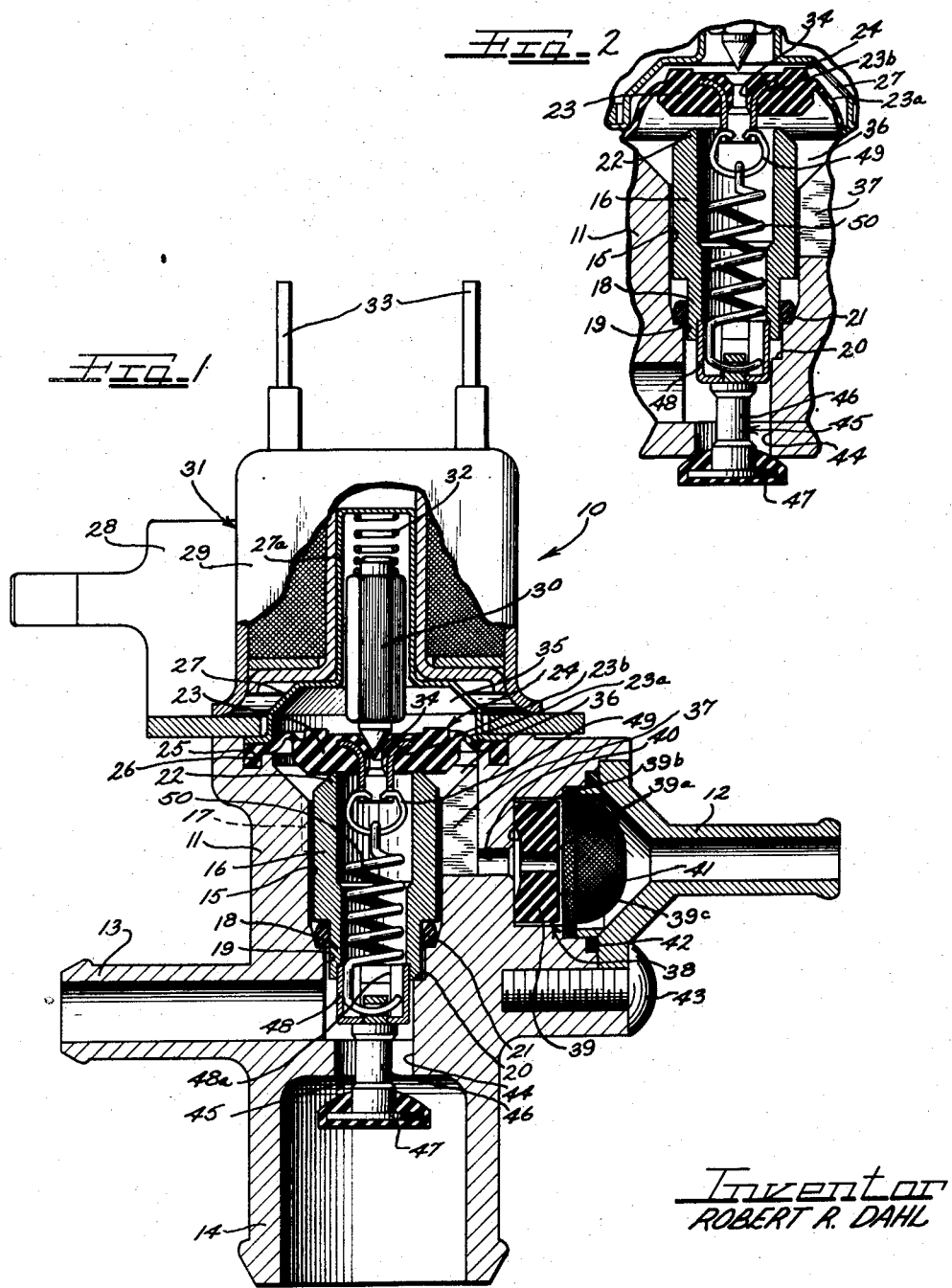
Inventor
ROBERT R. DAHL
By Hill, Sherman, Meroni, Gross + Simpson Attys

United States Patent Office 2,944,565
Patented July 12, 1960

2,944,565
ACTUATOR VALVE

Robert R. Dahl, Chicago, Ill., assignor to The Dole Valve Company, Chicago, Ill., a corporation of Illinois Filed May 8, 1956, Ser. No. 583,455

10 Claims. (Cl. 137—620)

This invention relates in general to improvements in fluid flow control devices, and more particularly to an actuator valve useful in connection with loading and unloading a hydraulic motor, although other uses and purposes may be apparent to one skilled in the art.

Still more particularly, the actuator valve of the present invention may be employed to control pressurized fluid flow to a hydraulic cylinder assembly. By way of a specific example, an actuator valve according to the present invention may be employed to gradually deliver pressurized fluid to a hydraulic actuating cylinder mounted in an automatic washing machine for gradually engaging a pulley with a driving belt in such a manner as to avoid overload of the motor. After full engagement of the pulley with the driving belt is effected, the actuator valve will function to maintain a predetermined maximum fluid pressure in the hydraulic cylinder for holding the pulley and belt in proper engagement during a given work cycle. At the end of the work cycle, the valve is operative to afford a rapid exhausting of fluid from the actuating cylinder.

Accordingly, the actuator valve of the present invention includes a casing having an inlet adapted to be connected to the fluid pressure source, a combination inlet-outlet adapted to be connected to a hydraulic actuating cylinder and an exhaust outlet adapted to be connected to a drain or other low pressure line. Within the casing, a solenoid controlled pilot operated valve coacts with a sliding sleeve or hollow piston in order to selectively connect the inlet-outlet to the fluid pressure inlet and the hydraulic cylinder, and the inlet-outlet to the exhaust outlet. A poppet valve generally operates in unison with the sliding sleeve and pilot-operated valve to open and close a passage between the exhaust outlet and the inlet-outlet to the hydraulic cylinder. Additionally, this poppet valve is spring connected with the pilot-operated valve and serves as a relief valve when closing the passageway between the exhaust outlet and the inlet-outlet to the hydraulic cylinder for maintaining a predetermined maximum pressure in the hydraulic cylinder. Energization of the solenoid opens the pilot operated valve and closes the combination relief and exhaust valve to connect the fluid pressure inlet to the inlet-outlet and the hydraulic cylinder, thereby causing actuation of the cylinder. Deenergization of the solenoid closes the pilot-operated valve and opens the combination relief and exhaust valve in order to connect the inlet-outlet and the exhaust port for exhausting the fluid from the cylinder.

It is therefore an object of this invention to provide an improved actuator valve for use in controlling pressurized fluid flow to an actuating device such as a hydraulic cylinder.

Another object of this invention is to provide an actuator valve which offers improved performance, simplified construction, and lower manufacturing cost.

Still another object of this invention resides in the provision of an actuator valve for use in controlling pressurized fluid flow to a hydraulic cylinder or the like, wherein better exhaust characteristics and operation in the critical low pressure range is obtained.

A further object of this invention resides in the provision of an actuator valve which will exhaust satisfactorily where extremely low inlet pressures are encountered.

A still further object of this invention is in the provision of an actuator valve including a sliding sleeve or hollow piston which is not opposed by any spring force in either direction of movement, and which is therefore capable of exhausting at low inlet pressures.

Another object of this invention is to provide an actuator valve for use in delivering a predetermined maximum fluid pressure to a hydraulic cylinder or the like, which includes a combination relief and exhaust valve.

A further object of this invention is in the provision of a flow control valve which feeds a predetermined maximum pressurized fluid flow to a hydraulic cylinder or the like.

A still further object of this invention is to provide a valve for controlling a pressurized fluid flow to a hydraulic actuator, which is capable of gradually delivering pressurized fluid to the actuator until the pressure in the actuator reaches a predetermined value, and maintaining the pressure at that value.

Other objects, features, and advantages of the invention will be apparent from the following detailed disclosure, taken in conjunction with the accompanying sheets of drawings, wherein like reference numerals refer to like parts in which:

On the drawings:

Figure 1 is a vertical sectional view of an actuator valve according to the invention in its "off" position and showing some parts in elevation and other parts broken away for purposes of clarity; and Figure 2 is a fragmentary view of the valve in Figure 1 illustrating the position of the movable parts when the valve is in "on" position.

As shown on the drawings:

Illustrated in the drawings is an actuator valve assembly, generally designated by the numeral 10, in accordance with the present invention. This assembly includes a casing 11 having an inlet fitting 12, an outlet fitting 13 functioning to accommodate fluid flow in either direction, and an exhaust fitting 14.

Merely by way of example, the valve 10 may be utilized in a system, wherein the inlet fitting 12 may be connected to the high pressure side of a pump or other suitable fluid pressure source, the outlet fitting 13 may be connected to a suitable fluid pressure actuating device such as a hydraulic cylinder, bellows or diaphragm assembly which is capable of translating the energy of a fluid pressure into a mechanical movement or the like for performing work, and the exhaust fitting 14 may be connected to a suitable drain or sump. More particularly, the valve 10 may be employed to actuate a hydraulic cylinder which, in turn, is mounted in an automatic washing machine in order to gradually bring a pulley and a driving belt into driving engagement, and hold the pulley and belt in engagement under a constant predetermined force during a particular cycle of operation of the washing machine. At the end of the cycle of operation, the valve would be capable of rapidly deactuating the hydraulic cylinder in order to cause rapid disengagement between the pulley and driving belts.

Extending vertically in the casing 11 is a bore 15 that slidably receives a sleeve or hollow piston 16 which is prevented from rotating relative to the casing by a suitable key and groove arrangement, such as indicated by the numeral 17. At the lower end of the sleeve, a diametrically reduced portion 18 is slidably received within a diametrically reduced bore 19 extending below the main bore 15. A substantially annular shoulder 20 is provided at the bottom of the bore 19 which serves as a stop to limit the downward movement of the sleeve 16. A portion between the bottom of the upper bore 15 and the top of the lower bore 19 is fashioned to define with the sleeve 16 a downwardly converging section which receives a flexible O-ring seal 21 for preventing the leakage of fluid along the outer walls of the sleeve 16.

An annular valve seat 22 is provided at the top of the slidable sleeve 16 for coaction with a flexible diaphragm 23 of a fluid operated solenoid controlled diaphragm valve 24, also known as a pilot-operated diaphragm valve. The diaphragm 23 may be constructed of any suitable resilient material, such as a rubber-like material or a synthetic plastic material, and is anchored at its periphery and therefore provided with a marginal bead 25 which is seated in an annular groove 26 of the casing 11. In order to retain the marginal bead 25 in place on the casing, a radial flange of a bell-shaped member 27 is positioned in overlying relationship relative the bead. Overlying the radial flange of the member 27 is a horizontal apertured portion of a mounting plate 28. A coil pack assembly 29, in turn, overlies the member 27 and the horizontal portion of the plate 28, and suitable fasteners (not shown) are provided to removably attach the coil pack assembly and the mounting plate to the casing 11. Extending upwardly from the bell-shaped member 27 is a tubular guide section 27a adapted to be received within the coil pack assembly 29 and to slidably receive therein a pilot plunger 30. The pilot plunger 30 coacts with the coil pack assembly 29 to function as an armature and constitute a solenoid 31. A return spring 32 constantly urges the pilot plunger 30 downwardly in the tubular guide 27a. Terminals 33, 33 are provided on the coil pack assembly 29 for connection to a suitable electrical power source.

The bottom end of the pilot plunger 30 is conically shaped to coact with a pilot port 34 extending axially through the center of a diaphragm 23 for accommodating opening and closing thereof. A fluid chamber 35 is defined by the upper side of the diaphragm 23 and the bell-shaped member 27, while an annular passageway 36 is defined by the underside of the diaphragm, the casing and the sleeve 16. Intercommunicating the chamber 35 and the passageway 36 for purposes of pressure loading the upper face of the diaphragm is an orifice or bleed hole 23a. This hole is smaller than the pilot port 34. Communicating with the annular passageway 36 is an inlet passageway 37 which receives the incoming pressurized fluid from the inlet fitting 12.

In order to maintain a substantially constant rate of fluid flow to the diaphragm valve 24 irrespective of the pressure of the fluid delivered to the inlet fitting 12, a flow control device, generally designated by the numeral 38 is positioned between the inlet fitting and the inlet passageway 37. This flow control device includes an elastic or flexible washer or disk 39 having an axial orifice 39a therein. The disk 39 is suitably seated in a counterbore of the casing which leads to a bore 40 interconnecting the inlet passage 37 and the inlet 12, and which is of greater size than the axial orifice 39a in the disk. The elastic disk 39 may be constructed of any suitable elastic material, such as rubber, synthetic rubber, or the like, and it is noted that the discharge side of the disk is cut away around the orifice 39a and 39b to allow relative movement between the discharge side thereof and its stationary seat. When fluid is passed through the flow control device 38, the pressure of the fluid upon the upper face 39c causes the elastic material in the region of the orifice 39a to be distorted and forced inward against its seat. This distortion causes the inlet end of the orifice 39a to be reduced in size or cross-sectional area according to the pressure of the fluid on the upper surface 39c, thereby automatically reducing the effective opening of the orifice 39a in accordance with the fluid pressure. Thus, irrespective of the pressure of the fluid at the inlet 12, the fluid delivered to the inlet 37 will be maintained substantially at a constant rate of flow.

A screen 41 is positioned ahead of the flow control device 38 for filtering out any large particles which may be contained in the fluid passing therethrough. The fitting 12 is removable from the casing 11 in order to provide access to the screen 41 and the flow washer 39. An O-ring seal 42 prevents leakage of fluid between the fitting and the casing, and a plurality of fasteners 43 (only one shown) maintain the fitting and the screen and the flow control washer 39 in position on the casing.

Therefore, it is seen that the fluid operated solenoid controlled diaphragm valve 24 selectively intercommunicates the inlet 12 and the outlet 13.

In order to exhaust the pressurized fluid from the hydraulic actuating device connecting to the outlet 13, means is provided to connect the outlet 13 to the exhaust port 14. A passageway or bore 44 intercommunicates the outlet 13 and exhaust port 14 and is selectively open and closed by a poppet valve 45. This poppet valve includes a stem 46, a valve head 47 at the lower end of the stem, and a guide portion 48 at the upper end of the stem. In order to assure proper sealing between the valve head 47 and the outlet end of the passageway 44, the valve head includes a flexible or resilient cap portion of rubber or other equivalent material, and is curvately shaped on the side which engages the discharge end of the passageway 44. The guide member 48 is in the form of a cup-shaped member with an apertured bottom to be received over a reduced end of the stem 46. The open end of the cup-shaped guide 48 is telescopically received within an enlarged counterbore of the sliding sleeve 16 in such a manner as to limit the distance the guide member 48 will move within the sleeve 16. The bottom open end of the sleeve 16, of course, communicates with the outlet 13, and in order to assure the proper fluid flow between these elements, the guide 48 is provided with slotted openings along its upstanding wall, as indicated at 48a.

In order to support the poppet valve 45 and enable it to coact with the movement of the diaphragm valve 24, a hollow metal insert 23b is molded into the diaphragm 23, and provided with transverse openings at its lower end to receive a substantially U-shaped bar 49 which is connected to one end of a spring 50. The other end of the spring is received in a transverse hole provided in the top of the poppet valve stem 46. In order to hold the poppet valve, the sliding sleeve 16 and the diaphragm 23 in their proper relative positions, as shown in Figure 1, for normal operation, the spring 50 is pretensioned a predetermined amount.

As shown in Figure 1, the movable parts in the valve 10 are located such that the valve is in its "off" position, while in Figure 2 the parts are shown as located such that the valve is in its "on" position. In its "off" position, the outlet 13 is connected to the exhaust port 14, and the diaphragm valve 24 is closed, while the valve in its "on" position closes the poppet valve 45 and opens the diaphragm valve 24, thereby providing communication between the inlet 12 and the outlet 13.

In operation, in actuating the hydraulic actuating device connected to the outlet 13, the solenoid 31 is energized, thus lifting the pilot plunger 30 out of the pilot port 34 of the diaphragm 23. Since the fluid can then pass downwardly faster through the larger pilot port 34, than upwardly through the orifice 23a, a pressure differential across the diaphragm 23 causes it to lift. Because of the connection between the diaphragm 23 and the poppet valve 45, the latter and the sliding sleeve 16 will be lifted in unison with the diaphragm until the poppet valve seats. In this instance, the poppet valve 45 is operating as an exhaust valve. The spring 50 is pretensioned an amount sufficient to hold the diaphragm 23 in contact with the top annular seat 22 of the sleeve 16 while the upward motion of all of these elements is in progress. This upward motion continues until the exhaust valve 45 seats against the outlet end of the passageway 44. The seating action stops the upward movement of the poppet valve and the sliding sleeve 16, but the diaphragm 23 continues to lift a sufficient distance in order to permit fluid to flow from the annular passageway 36 and into the center of the sleeve 16, wherein the inlet 12 is in then full communication with the outlet 13. Obviously, the exhaust port 14 is closed at this time. Hence, it is seen that the valve 45 closes before the valve 24 opens.

Fluid continues to flow to the outlet 13 and into the hydraulic actuating device until its stroke is completed and the pressure starts to build up to a desired holding value. Should the pressure build up beyond the desired holding value, it will cause the poppet valve 45 to open against the force of the spring 50 and divert part of the water flow through the exhaust port 14. Thus, the poppet valve 45 serves in this instance as a relief valve, and may therefore be properly termed as a combination relief and exhaust valve. As a relief valve, it will serve to maintain the holding pressure at the required value.

The relief valve setting actually depends upon a hydraulic balance between the pressure existing on the annular area of the underside of the diaphragm 23 and that which is imposed on the relief poppet valve. The guide portion 48 of the relief valve may be rigidly attached to the sleeve of the sleeve 16, or as shown in Figure 1, it may merely be held against a shoulder in this piston. With the diaphragm valve 24 in its open position and the poppet valve 45 in its closed position, the component movable parts of the valve 10 will take the position as shown in Figure 2.

When the solenoid 31 is deenergized, the diaphragm valve 24 tends to close in accordance with the normal operation of a pilot operated diaphragm valve, wherein pressure builds up on the top of the diaphragm forcing the diaphragm to seat and close the communication between the inlet 12 and the outlet 13. As the pressure continues to build up, the diaphragm, sleeve 16, and poppet valve 45 will be forced downwardly in unison and cause the combined relief and exhaust valve 45 to fully open, thereby permitting the hydraulic actuating device to exhaust rapidly. It should be noted that neither the exhaust, nor the fill strokes of the sleeve 16 are opposed by a spring of any type, thereby permitting satisfactory exhausting where inlet pressures are low.

It will be understood that modifications and variations may be effected without departing from the scope of the novel concepts of the present invention, but it is understood that this application is to be limited only by the scope of the appended claims.

I claim as my invention:

1. In a flow control valve, a casing having an inlet for connection to a source of pressurized fluid, an inlet-outlet for connection to an actuating device, and an exhaust port, a hollow member slidably mounted in said casing and having a valve seat on one end, a pilot-operated valve member coacting with said valve seat to selectively intercommunicate said inlet and said inlet-outlet, and a combination relief and exhaust valve connected with said pilot-operated valve member and seated on said exhaust port upon opening of said pilot operated valve member and responsive to fluid under pressure through said inlet-outlet for selectively intercommunicating said inlet-outlet and said exhaust port.

2. An actuator valve comprising a casing having an inlet, an outlet, and an exhaust port, a pilot operated valve for controlling fluid flow between the inlet and the outlet, and a poppet valve connected with said pilot operated valve for controlling fluid flow between the outlet and the exhaust port, the connection between said pilot operated valve and said poppet valve being yieldable and thereby accommodating said poppet valve to limit the maximum pressure in the outlet to a predetermined value.

3. An actuator valve comprising a casing having an inlet, an outlet, and an exhaust port, a pilot-operated diaphragm valve for controlling fluid flow between the inlet and the outlet, a combination exhaust and relief valve for controlling the fluid flow between the outlet and said exhaust port and limiting the maximum fluid pressure in the outlet to a predetermined value, and a uniform rate of flow control device in said inlet cooperating with said exhaust and relief valve and maintaining the pressure in said outlet at said predetermined value under varying inlet pressures.

4. An actuator valve comprising a casing having an inlet, an outlet, and an exhaust port, a solenoid controlled pilot-operated diaphragm valve for controlling fluid flow between the inlet and the outlet, and a combination exhaust and relief valve connected with said pilot-operated diaphragm valve and seated on said exhaust port upon opening of said pilot operated diaphragm valve and responsive to fluid under pressure passing through for controlling the fluid flow between the outlet and said exhaust port and limiting the maximum fluid pressure in the outlet to a predetermined value.

5. In a valve assembly including a casing having an inlet, an outlet and an exhaust port, a fluid operated solenoid controlled diaphragm valve communicating at its inlet side with said inlet and at its discharge side with said outlet, a combination exhaust and relief valve communicating at its inlet side with said outlet and at its discharge side with said exhaust port, said fluid operated valve and said combination valve acting in unison to selectively communicate the inlet and outlet or the outlet and the exhaust port, and yieldably connected between said diaphragm valve and said combination valve operative to limit the maximum fluid pressure at said outlet when the inlet communicates with the outlet.

6. In a valve assembly including a casing having an inlet, an outlet and an exhaust port, a bore in said casing intercommunicating said inlet and outlet, a sleeve slidable in said bore, a pilot-operated valve coacting with one end of said sleeve for controlling fluid flow between said inlet and outlet, and a poppet valve yieldably connected to and movable with said pilot-operated valve to control fluid flow between said outlet and said exhaust port.

7. In a valve assembly including a casing having an inlet, an outlet and an exhaust port, a bore in said casing interecommunicating said inlet and outlet, a sleeve slidable in said bore and having an annular valve seat at the end adjacent the inlet, a pilot-operated diaphragm coacting with said valve seat to control fluid flow between said inlet and said outlet, a passageway intercommunicating said outlet and said exhaust port, a poppet valve operable in said passageway controlling fluid flow therethrough, and means for resiliently connecting said diaphragm and poppet valve, whereby said poppet closes said opening before said diaphragm unseats from said valve seat to interconnect said inlet and outlet.

8. In a valve assembly including a casing having an inlet, an outlet and an exhaust port, a bore in said casing intercommunicating said inlet and outlet, a sleeve slidable in said bore and having an annular valve seat at the end adjacent the inlet, a pilot-operated diaphragm coacting with said valve seat to control fluid flow between said inlet and said outlet, a passageway intercommunicating said outlet and said exhaust port, a poppet valve operable in said passageway for controlling fluid flow therethrough and a pretensioned spring for resiliently connecting said diaphragm and poppet valve, whereby said poppet closes said opening before said diaphragm unseats from said valve seat to interconnect said inlet and outlet.

9. In a valve assembly including a casing having an inlet, an outlet and an exhaust port, a bore in said casing intercommunicating said inlet and said outlet, a sleeve freely slidable in said bore and having an annular valve seat at the end adjacent said inlet, a solenoid controlled pilot-operated diaphragm coacting with said valve seat capable of opening and closing communication between said inlet and said outlet, a passageway intercommunicating said outlet with said exhaust port, a combination relief and exhaust valve coacting with said passageway for opening and closing same, and a pretensioned spring connecting said diaphragm and valve, whereby energization of said solenoid controlled diaphragm closes said combination relief and exhaust valve and then unseats the diaphragm from the valve seat of the slidable sleeve in order to open communication between the inlet and the outlet, and said combination relief and exhaust valve further serving to limit the maximum fluid pressure developed at the outlet.

10. In a valve assembly including a casing having an inlet, an outlet and an exhaust port, a bore in said casing intercommunicating said inlet and said outlet, a sleeve slidably in said bore having an annular valve seat at the end adjacent said inlet, a pilot operated diaphragm coacting with said valve seat to control fluid flow between said inlet and said outlet, a poppet valve actuatable by said diaphragm for controlling fluid flow between the outlet and the exhaust port, and a uniform rate of flow control device in said inlet cooperating with said poppet valve and maintaining the pressure in said outlet at a predetermined value under varying inlet pressures.

References Cited in the file of this patent

UNITED STATES PATENTS

| | | |
|---|---|---|
| 1,903,338 | Horne | Apr. 4, 1933 |
| 2,705,608 | Phillips | Apr. 5, 1955 |
| 2,706,995 | May | Apr. 26, 1955 |
| 2,722,233 | Schneck | Nov. 1, 1955 |
| 2,815,041 | Rimsha et al. | Dec. 3, 1957 |

FOREIGN PATENTS

| | | |
|---|---|---|
| 445,559 | Great Britain | Apr. 14, 1936 |